United States Patent
Drummond et al.

(10) Patent No.: US 10,257,226 B2
(45) Date of Patent: Apr. 9, 2019

(54) IDENTIFYING AND TRAPPING WIRELESS BASED ATTACKS ON NETWORKS USING DECEPTIVE NETWORK EMULATION

(71) Applicant: 802 Secure, Inc., Livermore, CA (US)

(72) Inventors: Garry Drummond, Pleasanton, CA (US); Paul Vilevac, Pleasanton, CA (US)

(73) Assignee: 802 Secure, Inc., Pleasanton, CA (US)

( * ) Notice: Subject to any disclaimer, the term of this patent is extended or adjusted under 35 U.S.C. 154(b) by 269 days.

(21) Appl. No.: 15/176,077

(22) Filed: Jun. 7, 2016

(65) Prior Publication Data
US 2017/0279852 A1    Sep. 28, 2017

Related U.S. Application Data

(60) Provisional application No. 62/313,037, filed on Mar. 24, 2016.

(51) Int. Cl.
*H04L 29/06* (2006.01)

(52) U.S. Cl.
CPC ................ *H04L 63/1491* (2013.01)

(58) Field of Classification Search
CPC .......... H04L 63/1491; H04L 63/1416; H04L 63/145; H04L 63/02; H04L 63/1425; H04L 63/1433; H04L 2463/142; H04L 2463/146; H04L 63/08
See application file for complete search history.

(56) References Cited

U.S. PATENT DOCUMENTS

| | | | |
|---|---|---|---|
| 6,363,489 B1* | 3/2002 | Comay | H04L 63/1416 709/224 |
| 7,107,347 B1 | 9/2006 | Cohen | |
| 7,522,905 B2 | 4/2009 | Hammad et al. | |
| 7,756,933 B2 | 7/2010 | Reshef et al. | |

(Continued)

OTHER PUBLICATIONS

Bowen, Brian M. et al. et al. "Automating the Injection of Believable Decoys to Detect Snooping" Department of computer science, Columbia University, NY. Publication: WiSec'10, Mar. 22-24, 2010, Hoboken, New Jersey, USA.

(Continued)

*Primary Examiner* — Jason K Gee
*Assistant Examiner* — Shu C Gao
(74) *Attorney, Agent, or Firm* — Womble Bond Dickinson (US) LLP

(57) ABSTRACT

A system and method are provided that enable identifying and trapping cyber security attacks via wireless connectivity on enterprise and corporate networks. A deceptive network emulation of a specific customer network is used to invite and draw in possible attackers. The attacker is also enticed to initiate attack on the emulated deceptive network. Packet header inspection and deep packet evaluation of the attack are used for generating possible signatures of the attacker and the attack. The information from deep packet inspection combined with the understanding of attack modality derived from enablement of attack on the deceptive network are used to generate detailed defensive methodologies, response capabilities and attack signatures, so that various types of cyber attacks including zero-day attacks from the attacker can be identified, prevented or addressed and responded to.

13 Claims, 6 Drawing Sheets

(56) References Cited

U.S. PATENT DOCUMENTS

| | | | |
|---|---|---|---|
| 8,122,505 | B2 | 2/2012 | Verma |
| 8,145,191 | B2 | 3/2012 | Hammad et al. |
| 8,429,746 | B2 | 4/2013 | Capalik |
| 8,656,493 | B2 | 2/2014 | Capalik |
| 8,752,174 | B2 | 6/2014 | Buford et al. |
| 8,789,184 | B2 | 7/2014 | Yoo |
| 8,789,191 | B2 | 7/2014 | Bhagwat et al. |
| 8,855,313 | B2 | 10/2014 | Kumoluyi et al. |
| 9,807,114 | B2 * | 10/2017 | Kolton ............... H04L 63/1491 |
| 9,866,584 | B2 * | 1/2018 | Capalik ................ H04L 63/145 |
| 2004/0028123 | A1 * | 2/2004 | Sugar ................... H04L 1/1664 375/224 |
| 2005/0166072 | A1 | 7/2005 | Converse et al. |
| 2007/0173199 | A1 * | 7/2007 | Sinha ................... H04W 12/12 455/67.11 |
| 2010/0235919 | A1 | 9/2010 | Adelstein et al. |
| 2011/0065452 | A1 * | 3/2011 | Noonan .................... G01S 5/02 455/456.1 |
| 2011/0162060 | A1 * | 6/2011 | Vijayakumar ........ H04L 12/413 726/13 |
| 2013/0047257 | A1 * | 2/2013 | Aziz .................. G06F 9/45537 726/24 |
| 2013/0133072 | A1 | 5/2013 | Kraitsman et al. |
| 2013/0198845 | A1 | 8/2013 | Anvari |
| 2013/0227689 | A1 * | 8/2013 | Pietrowicz .............. G01R 1/20 726/23 |
| 2013/0242743 | A1 | 9/2013 | Thomas et al. |
| 2013/0282579 | A1 | 10/2013 | Palnitkar et al. |
| 2013/0305357 | A1 | 11/2013 | Ayyagari et al. |
| 2014/0096229 | A1 | 4/2014 | Burns et al. |
| 2014/0115704 | A1 | 4/2014 | Miller |
| 2014/0237596 | A1 | 8/2014 | Grytsan et al. |
| 2015/0188940 | A1 | 7/2015 | Lapidous |
| 2015/0326587 | A1 * | 11/2015 | Vissamsetty ........ H04L 63/1408 726/23 |
| 2015/0326599 | A1 * | 11/2015 | Vissamsetty ............ H04L 63/02 726/11 |

OTHER PUBLICATIONS

Bowen, Brian M. et al., "A system for generating and injecting indistinguishable network decoys" Computer Science Department, Columbia University, 2012.

Bowen, Brian M. et al. "Baiting inside attackers using decoy documents." In Proceedings of the 5th International ICST Conference on Security and Privacy in Communication Networks (SecureComm), pp. 51-70, Sep. 2009.

Bowen, Brian M. "Design and Analysis of Decoy Systems for Computer Security" Dissertations ( Ph.D), Department of Computer Science, Columbia University, 2011.

Yek, Suen, "How to build a faraday cage on the cheap for wireless security testing" School of Computer and Information Science Security; Edith Cowen University. Proceedings of 3rd Australian Computer, Network & Information Forensics Conference. 2005.

Charles, Kellep A., CISSP; "Decoy Systems: A new Player in Network Security and Computer incident response"; International Journal of Digitsal Evidence; Winter 2004, vol. 2, Issue 3.

Threlkeld, Tom Steinert, "Decoy Networks Growing at Double-Digit Rates" CruxialTechnologies; publication: Sep. 2013.

"International Search Report and Written Opinion of the International Searching Authority dated Apr. 10, 2017; International Application No. PCT/US2017/015199", (dated Apr. 10, 2017).

* cited by examiner

IDENTIFYING AND TRAPPING WIRELESS BASED ATTACKS ON NETWORKS USING DECEPTIVE NETWORK EMULATION

CROSS-REFERENCE TO RELATED APPLICATIONS

This application claims the benefit of U.S. Provisional Patent Application No. 62/313,037, filed Mar. 24, 2016, the contents of which are hereby incorporated by reference as if fully stated herein.

BACKGROUND OF THE INVENTION

Field of the Invention

One aspect of the disclosure herein relates to a system and method for identifying and preventing cyber attacks on networks, and specifically on networks via wireless access points which are vulnerable.

Prior Art

One of the problems of proliferation of computer systems and networks is the lack of security from cyber attacks that have increased over the last few years. Threats against computer and data networks continue to multiply, with hackers becoming more sophisticated and innovative. Existing security solutions are often unable to keep up with the challenges continuously being thrown at them. One of the currently used methods for securing network and computational resources is the honeypot or decoy technology. This technique as used conventionally involves seeding a system/network with network nodes and data that appears authentic but in fact is spurious. Attackers accessing the network through the access points are then directed to the phony network and data structure. The attackers are thus identified as they try to attack this spurious network and prevented from penetrating the real network. Decoys are generally used to identify the attacker and develop a signature of the attackers. These signatures are used in firewalls to detect and prevent attacks by the attacker.

With the advent of wireless technology as a major player in the communications and data transfer arena, network security issues have become a major concern as the firewalls etc. used in wired technologies are easily breached by attacking the network through the distributed wireless access capabilities.

Current Protection Protocols

The wireless access points are protected today by minimal security that may be implemented as a part of the Wireless Applications Protocol (WAP) and its advanced derivatives. Security for Wi-Fi has been originally by the use of Wired Equivalent Privacy (WEP) algorithms WEP algorithms have moved from a 64 WEP bit to 256 bit WEP and are even now the most used wireless encryption algorithms. In general, these are not particularly effective in preventing hackers from accessing the data.

Wi-Fi Protected Access (WPA) is an upgrade on the WEP algorithm and is mostly implemented using a 256 bit key in the WPA-PSK (pre-shared Key) protocol. Some of the significant changes implemented with WPA include message integrity checks (to determine if an attacker has captured or altered packets passed between the access point and client) and the Temporal Key Integrity Protocol (TKIP), TKIP employs a per-packet key system that was radically more secure than fixed key used in the WEP system. TKIP was later superseded by Advanced Encryption Standard (AES). Despite the improvements in the WPA protocol, though more powerful and capable of providing protection to the wireless data, it is still comparatively easy to break by hackers using high powered computer systems.

The WPA-II algorithm is a more robust algorithm that has the WAP protocol with mandatory AES used with the addition of Counter Cipher Mode with Block Chaining Message Authentication Code Protocol (CCMP) instead of TKIP. However, in conventional WPA2-capable access points, an attack vector through the Wi-Fi Protected Setup (WPS) often remains possible. The attacks, especially with today's high powered and fast computing systems, make the attacks through Wi-Fi and other wireless access points remain a concern.

BRIEF DESCRIPTION OF THE DRAWINGS

The embodiments herein are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

DETAILED DESCRIPTION OF THE INVENTION

Figure 1:
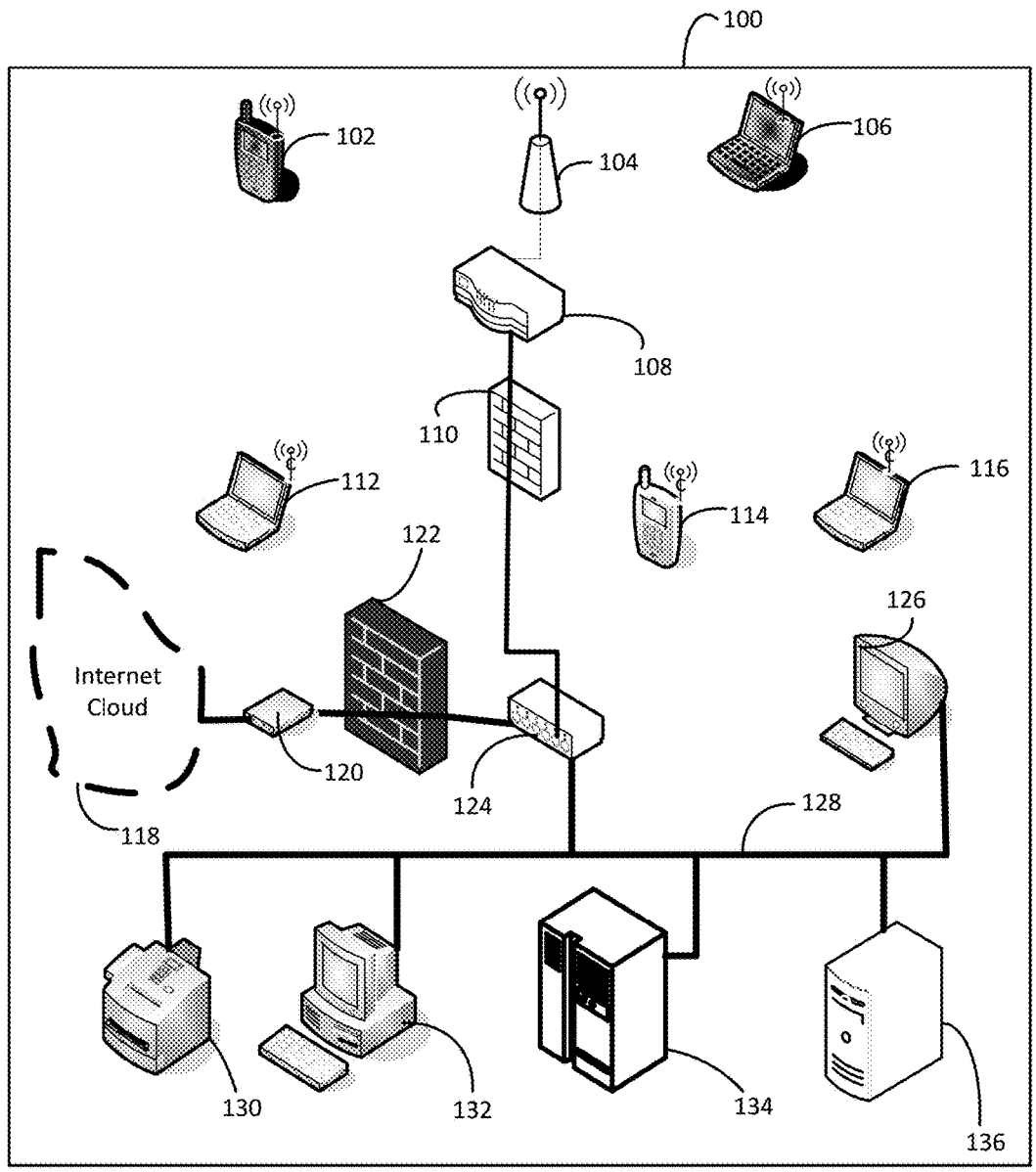
FIG. 1 is a block diagram illustrating a network with wireless access and internet access.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, it is understood that embodiments disclosed herein may be practiced without these specific details. In certain instances, well-known or conventional details, such as circuits, structures, and techniques, are not described in order to provide a concise discussion of example embodiments.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

The inventors herein have recognized that conventional decoy systems do not currently have a method or system to fully characterize an attacker (hacker) and an attack. With respect to conventional decoy systems, there still exist a number of challenges that must be overcome in order for the decoy and deceptive networks to successfully generate a fully comprehensive security solution for any attack by identification of the attacker and the attack itself.

Generally, the present disclosure relates to a system and method that enable identifying and trapping cyber security attacks via wireless connectivity on enterprise and corporate networks. According to one aspect, the disclosed method uses deceptive network emulation of specific customer networks to invite and draw in possible attackers. The attacker is also enticed to initiate attack on the emulated deceptive network. Packet header inspection and deep packet evaluation of the attack are used for generating possible signatures of the attacker and the attack. The information from deep packet inspection combined with the understanding of attack modality derived from enablement of attack on the deceptive network are used to generate detailed defensive methodologies, response capabilities and attack signatures, so that all types of cyber-attacks including zero-day attacks from the attacker can be identified, prevented or addressed and responded to.

By virtue of the arrangements disclosed herein, it is possible to provide more accurate and complete identification and tracking of an attacker and an attack. In addition, it is advantageously possible to characterize the attack itself to understand the attack modality to generate corrective actions if and when an attack is successfully executed.

According to one aspect disclosed herein, a deceptive network emulates the actual network under consideration, with multiple nodes of the actual network emulated in a manner that retains the realism of the original network by having all the components of the network.

According to another aspect disclosed herein, a wireless risk audit tool (WRAT) has multiple custom antennae that are disposed around the location of the network capable of open and concealed deployment while allowing high bandwidth and range coverage for detecting both general purpose and protocol specific transmissions within the covered location. The technology also uses off network backhaul via GPS, GPRS, CDMA, satellite, cloud and other cell services in addition to the standard Wi-Fi, Blue tooth and cellular communications.

In some example embodiments, the WRAT has capabilities to check and identify rogue connection attempts by checking and profiling unauthorized attempts at network penetration, features of the connection, behavior of the connection etc.

According to a further aspect disclosed herein, the WRAT is constructed to dynamically route to an alternate access point that connects the identified rogue connections from unauthorized, malicious and suspicious wireless enabled devices to the deceptive network via a bridge or tunnel connection that remains invisible to the attacker. Once the attacker is connected to the deceptive network, the attacker is further encouraged to break into and access the network and initiate attacks on the nodes of the deceptive network.

Further disclosed is a data capture and forensic analysis and reporting tool (DFR) that enables the capture and storage of all data relating to the attacker who has been deliberately lured into the deceptive network, including the signatures extracted from the packet headers, and from deep packet inspection of the attack, the attack modality extracted from the actual attack on the nodes of the deceptive network by the attacker, without the knowledge of the attacker.

In another aspect of the disclosure herein, the analyzer conducts the forensic analysis on the collected data to extract the signatures and the attack modality and generate the responses for mitigating any further attacks and, in the event of a successful attack, how to respond and recover from it. This generated information is then combined with any available historic data and supplied to the WRAT and to the network security firewalls for identification of the attacker's signatures and behavior patterns and stoppage of attacks by the attacking rogue mobile units. It also enables the WRAT to prevent similar attacks by other attacking entities. The information collected on the attacker and attack can also be supplied to other protective devices to prevent attacks using similar methods.

Turning to FIG. 1, FIG. 1 illustrates a network 100 having a connection to the internet 118 that is connected to the network through a modem and that is reasonably well protected by a firewall 122 (hereinafter a "powerful" firewall). The network is also accessible by mobile wireless devices through access points 104. The access points allow the mobile devices, such as cell phones 102 and 114, laptops and tablets 112, 116 and 106, to connect to and access the network wirelessly. Of these, 112, 114, and 116 are access enabled authentic users of the network while 102 and 106 are shown as rogue attackers of the network or hackers. The weak firewall 110 implemented using wireless protection protocols for the wireless access may not provide the necessary security for the network. Once a hacker accesses the wireless router 108 through the wireless access point 104 and breaks the security firewall 110, there is generally little to limit access to and an attack within the network. For example, the hacker may have free access to the network connection bus 128 and the connected devices 126, 130, 132, 134, 136 within the network through the router or switch 124. The network will also have a wired connection to the internet 118 through a modem 120, the wired connection being protected for incoming and outgoing data by a powerful firewall 122.

The currently disclosed network protection system (NPS) and method can be implemented on a computing and control server system such that the NPS provides a means to identify and stop hackers who are trying to attack an enterprise's local area network (LAN) through the wireless access capability and using the vulnerabilities that exist with the wireless access to the protected network.

Figure 2:
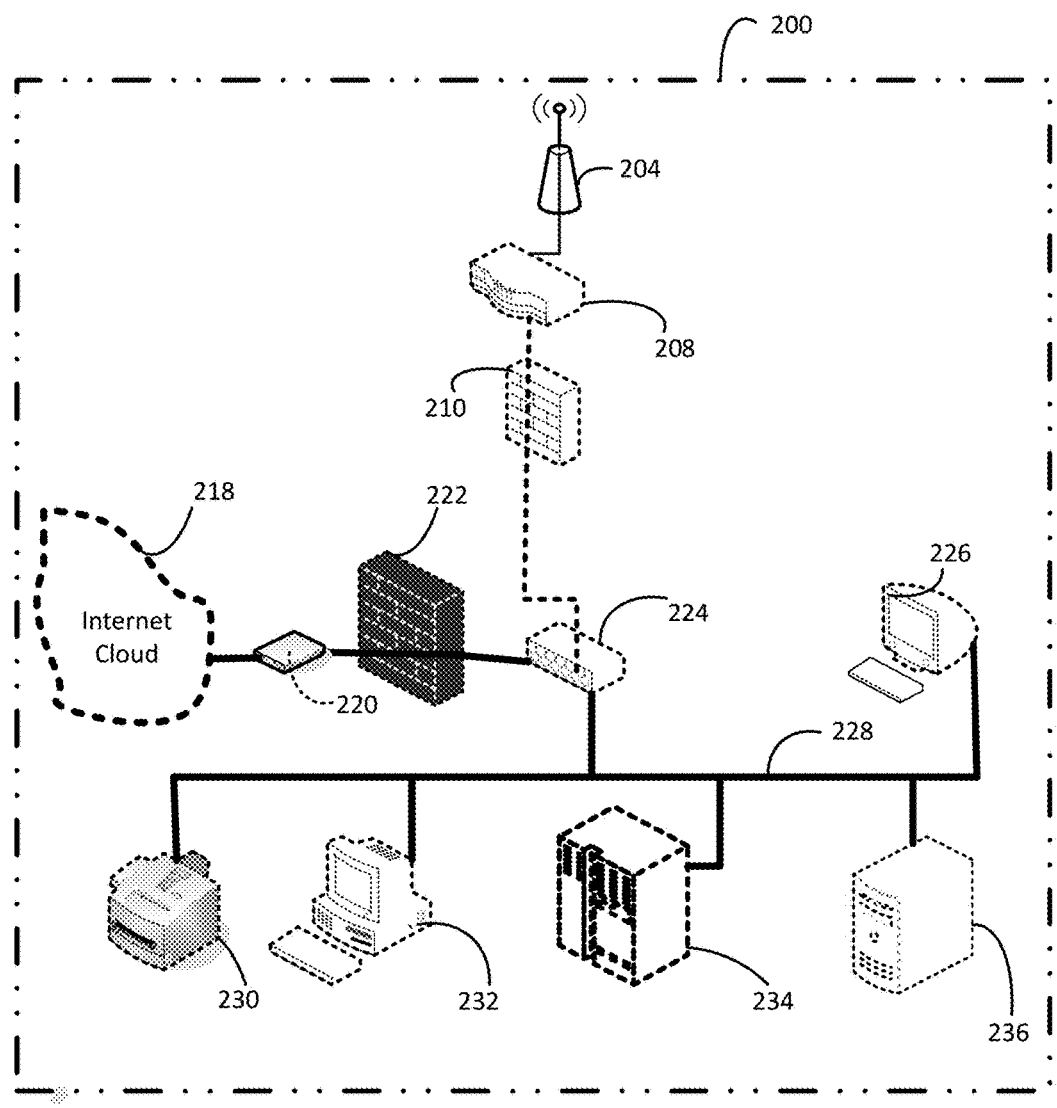
FIG. 2 is a block diagram illustrating an example of deceptive network emulation of a network to be protected according to an example embodiment.

The NPS includes three component groups, each having a vital part in providing protection to die network. First, in this example embodiment, the NPS includes an emulation of the original network on the computing and control system acting as a deceptive network. FIG. 2 illustrates an example of such a deceptive network 200 that emulates an actual network that is to be protected (such as the network 100). The deceptive network 200 has a deceptive access point 204, an emulated wireless router 208, a fire-wall 222, a router/switch 224 and multiple nodes 226, 230, 232, 234 and 236 of the actual network (e.g., network 100) connected to an emulated bus 228. Each of the components included in the deceptive network 200 is emulated in a manner that retains the realism of the original network (e.g., network 100). This is performed, for example, by having all of the components of the deceptive network 200 include the connection to the internet 218 through a modem 220, the connection being protected for incoming and outgoing connections by a firewall 222 as in the original network.

Figure 4:
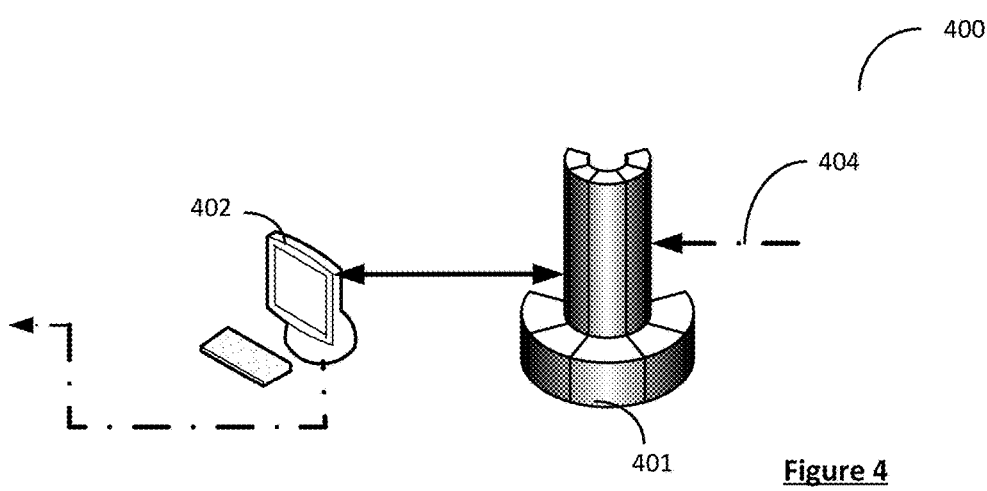
FIG. 4 is a block diagram illustrating a data capture, forensic analysis and a reporting tool (DFR) according to an example embodiment.

Second, in this example embodiment, the NPS includes a data capture and forensic analysis and reporting tool (DFR) which enables the capture, deep packet inspection, and extraction of threat information with analysis and storage of all collected and extracted data relating to any attacker and the attack modality from any attack. FIG. 4 is a block diagram illustrating an example DFR 400. As illustrated in FIG. 4, the DFR 400 is implemented on a system 401 capable of receiving, storing and processing the collected data and displaying the results on a display 402. The data on the attack is collected from the deceptive network 200 via the connection 404 to the deceptive system.

Figure 3:
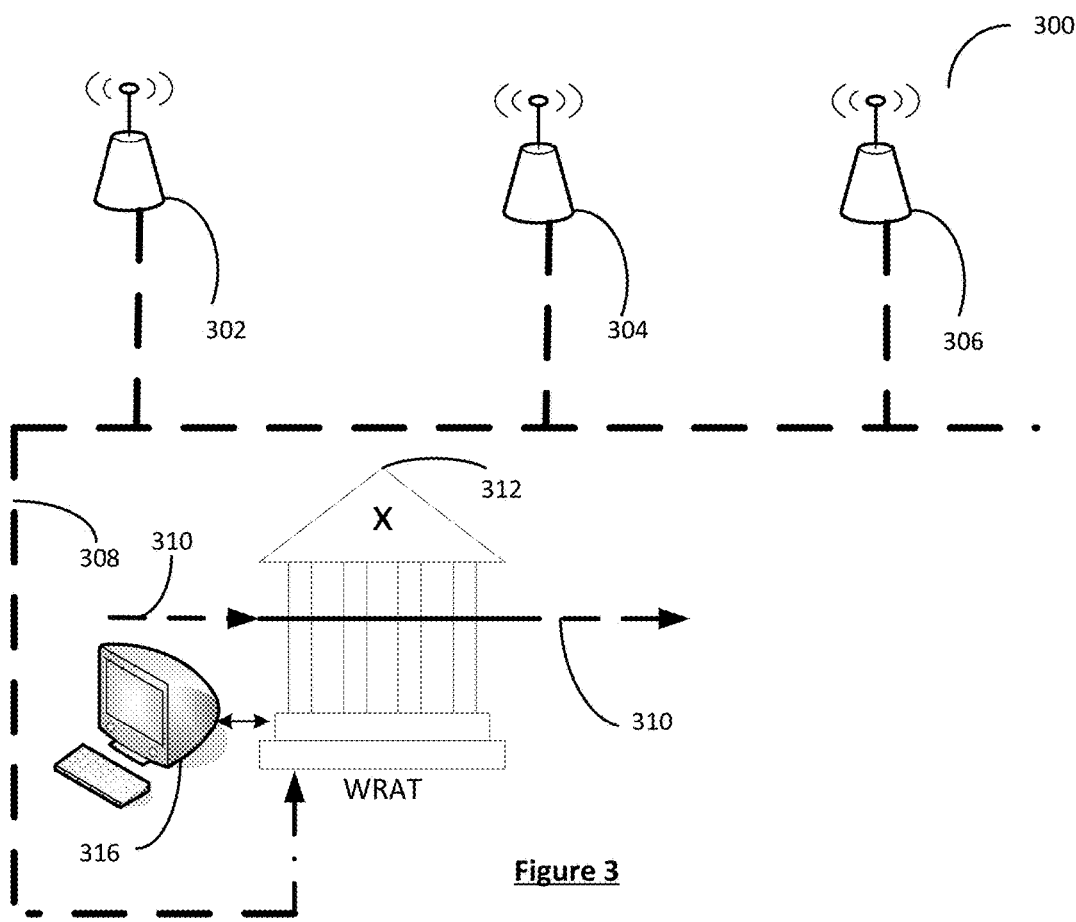
FIG. 3 is a diagrammatic representation illustrating a Wireless Risk Audit tool (WRAT) and access control implementation according to an example embodiment.

Third, in this example embodiment, the NPS includes a wireless risk audit tool (WRAT). FIG. 3 illustrates a block diagram 300 of an example WRAT system. As illustrated in FIG. 3, the WRAT system includes a WRAT monitoring unit 316 and processing unit 312. The WRAT system further includes multiple hidden and open access points (e.g., access points 302, 304 and 306) each including one or more antennas that monitor the radio activity over a wide range of radio frequency spectrum to identify activity within the enterprise local area network (LAN) location. The access points 302, 304 and 306 can provide information to the WRAT processing unit 312 for identifying suspicious radio activity within the protected enterprise area.

Even though the components of the NPS have been described as being implemented on individual processing systems, it is not essential to do so. It is possible to implement all of the NPS components on a single network protection processing system (NPPS) having sufficient processing, communication and storage capability.

Operation of the Network Protection System

Figure 5:
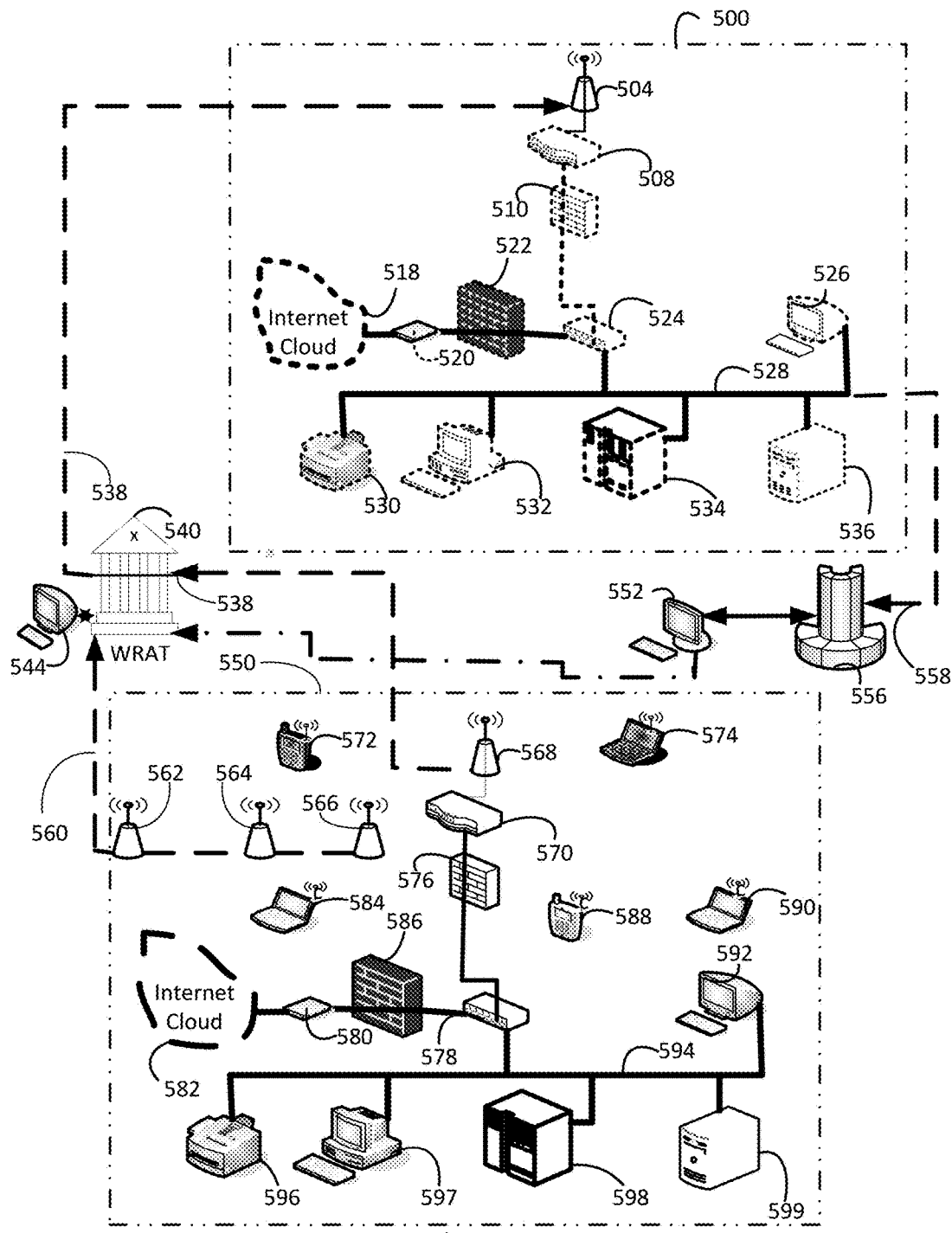
FIG. 5 is a block diagram illustrating a system using a deceptive network to capture and identify attackers and an attack, to provide protection from attacks and to establish capability to recover in the event of attack according to an example embodiment.

FIG. 5 is a block diagram illustrating an implementation of a network protection processing system using a deceptive network 500 to enable protection of a network 550 according to one example embodiment. Deceptive network 500 may be, as one example, deceptive network 200 illustrated in FIG. 2. In this case, deceptive network 500 may include, among other things, pseudo access point 504 (which may correspond to pseudo access point 204 in this example), emulated wireless router 508 (which may correspond to emulated wireless router 208 in this example), firewall 510 (which may correspond to 210 in this example), router or switch 524 (which may correspond to 224 in this example), firewall 522 (which may correspond to 222 in this example), modem 520 (which may correspond to modem 220 in this example), and internet 518 (which may correspond to internet 218 in this example). Also, deceptive network 500 includes multiples nodes of the of the actual network 526, 530, 532, 534, 536 (which may correspond to nodes 226, 230, 232, 234, 236 in this example) connected to an emulated bus 528 (which may correspond to emulated bus 228 in this example).

Network 550 may be, as one example, network 100 illustrated in FIG. 1. In this case, network 550 includes, among other things, access point 568 (which may correspond to access point 104 in this example), wireless router 570 (which may correspond to wireless router 108 in this example), security firewall 576 (which may correspond to security firewall 110 in this example), router or switch 578 (which may correspond to router or switch 124 in this example), powerful firewall 586 (which may correspond to powerful firewall 122 in this example), modem 580 (which may correspond to modem 120 in this example) and internet 582 (which may correspond to internet 118 in this example). Also, network 550 includes bus 594 (which may correspond to bus 128 in this example), and connected devices 592, 596, 597, 598, 599 (which may correspond to devices 126, 130, 132, 134, 136 in this example) connected through the router or switch 578.

The network processing system operates in conjunction with the enterprise network 550 that is to be protected. The operation is described using the example block diagrams of the component units. These block diagrams include the network to be protected 550, the deceptive network 500, a WRAT (such as WRAT 300 illustrated in FIG. 3), and a DFR (such as DFR 400 illustrated in FIG. 4). In this case, the WRAT may include a processing unit 540 (corresponding to processing unit 312), a monitoring unit 544 (corresponding to monitoring unit 316) and link 538 (corresponding to link 310). The DFR may be implemented on a system 556 (corresponding to system 401) capable of receiving, storing and processing collected data and displaying the results on a display 552 (corresponding to display 402). The data on the attack is collected from the deceptive network 500 via the connection 558 (corresponding to connection 404) to the deceptive system.

A set of monitoring access points 562, 564 and 566 are distributed over the network area to continuously monitor the radio frequency activity within the protected network area. The monitoring access points may be, as one example, access points 302, 304 and 306 of WRAT 300 illustrated in FIG. 3.

When wireless customers engage in communication and connection activity, that activity information is provided to the WRAT processing unit 540 to identify suspicious activity by mobile units within the premises based on their behavior pattern and un-authorized attempts to connect to the network access points. The monitoring of the activity is separated from the network access connections and kept invisible to the mobile devices being monitored. Though a direct link is shown for the monitoring units to the WRAT in FIGS. 3 and 5, the link can also be any of GPS, satellite, Bluetooth® or similar alternate connections in addition to direct link and Wi-Fi links. All the wireless activity within the network premises, both authenticated and un-authenticated activities, are captured by monitoring access points 562, 564 and 566 and provided to the WRAT processing unit 540 via a connection 560 (which may correspond to connection 308 illustrated in FIG. 3 in this example embodiment) for analysis of suspicious behavior patterns.

Any activity that is identified by the WRAT processing unit 540 as authorized, legitimate and falling into the acceptable behavior patterns, including connections attempts from authorized mobile units 584, 588, 590, are allowed into the network 550 via the access point 568. As one example, authorized mobile units 584, 588, 590 may be authorized mobile units 112, 114, 116 illustrated in FIG. 1 and access point 568 may be access point 104 illustrated in FIG. 1.

Any un-authorized access attempts and suspicious activity and suspicious behavior by rogue mobile devices 572 and 574 (which, as one example, correspond to rogue mobile devices 102 and 106 illustrated in FIG. 1) within the network premises identified as such from the information captured and passed on to the WRAT processing unit 540, over the link 560 (for example, corresponding to 308 illustrated in FIG. 3), by the monitoring access points 562, 564, 566 are immediately diverted to a pseudo-access point 504 (which may be, in some embodiments, pseudo-access point 202 illustrated in FIG. 2) that is part of the deceptive network 500 over the link 538 (which, as one example, corresponds to 310 illustrated in FIG. 3) under control of WRAT processing unit 540.

The cyber attackers having these identified rouge mobile units 572 and 574, are enticed to break into the deceptive network 500 by providing them exposed vulnerabilities established within the firewall 510 (which may be, in some embodiments, firewall 210 in FIG. 2) of the deceptive network 500 through the pseudo-access point of the deceptive network 504.

When a rouge mobile unit such as 572 and 574 attacks the deceptive network 500, the deceptive network 500, and penetrates the pseudo-firewall, the details of the packets generated by the attacker are in reality captured by the deceptive network 500. Once the attacker is lured into the deceptive network 500 the attacker is still encouraged to search the network and initiate attacks against the nodes of the deceptive network 500. This allows the deceptive network 500 to collect information on the modality of the attack by the specific attacker to be supplied to the DFR (such as DFR 400 illustrated in FIG. 4) for defining remedial action in the event of a successful future attack by the attacker on the network. The capture of the attack by the deceptive network 500 enable the collection of packet header information, addresses of the attacker, routing methods etc. to be extracted by the DFR to which the information is supplied. Further the DFR conducts deep packet information on the packets of the attack to correlate it to the modality of attack and other attack features. The total information collected is analyzed to generate the necessary signatures of the attacker and attack to be provided to the NPS to enable it to recognize and foil future attacks by the same attacker using same or similar methods of penetration and attack.

FIG. 5 is merely one example of a particular implementation and is merely intended to illustrate the types of components that may be present in deceptive network 500 and the network 550. Note that while deceptive network 500 and the network 550 are illustrated with various components of a data processing system, it is not intended to represent any particular architecture or manner of interconnecting the components; as such details are not germane to embodiments of the present invention. It will also be appreciated that other data processing systems which have fewer components or perhaps more components may also be used with embodiments of the invention.

Figure 6:
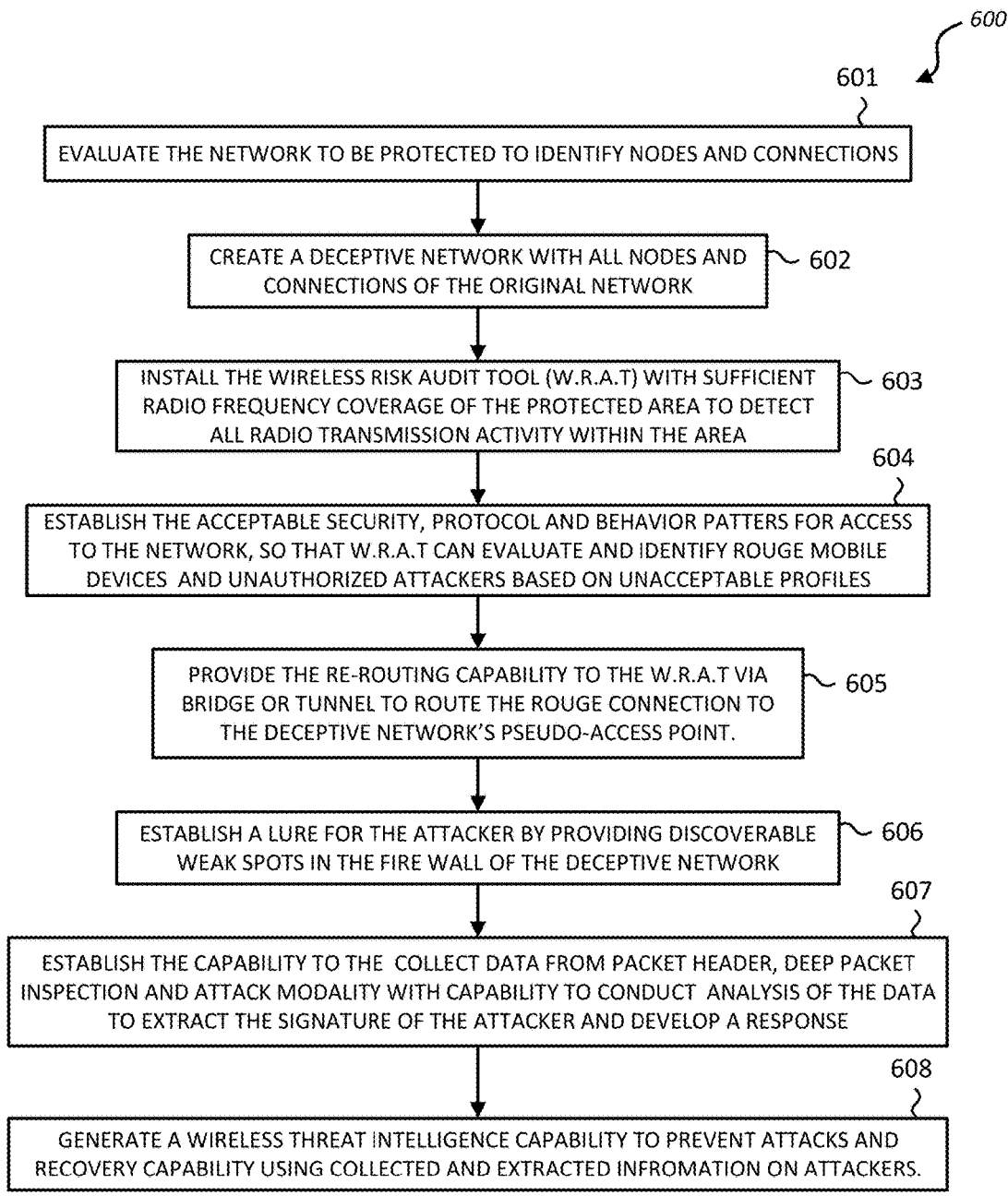
FIG. 6 is a flow chart illustrating establishment of a network protection system using a deceptive network according to an example embodiment.

FIG. 6 is a flow chart 600 of the establishment of the NPS to provide protection to a network 550 using a NPPS using a deceptive network 500.

In this regard, the following embodiments may be described as a process 600, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc. Process 600 may be performed by processing logic that includes hardware (e.g., circuitry, dedicated logic, etc.), software (e.g., embodied on a non-transitory computer readable medium), or a combination thereof.

In block 601, network 550 to be protected is identified. It is evaluated to identify the coverage of area necessary and to identify nodes and connections that exist therein.

In block 602, a deceptive network that emulates all the different types of nodes within the actual network is generated. The aim is to provide a deceptive network that looks and feels real to any attacker.

In block 603, a wireless risk audit tool (WRAT) is instituted with sufficient radio frequency coverage and access points to provide full coverage of protected area of the network. The WRAT is enabled to detect and monitor all radio transmission activity within the covered and protected network coverage area.

In block 604, a set of acceptable security protocol and behavior patterns for wireless activity within the protected area and access to the network is established, so that the WRAT can evaluate and identify radio activity by permitted and authorized mobile devices and distinguish them from rogue mobile devices and unauthorized attackers based on unacceptable activity profiles.

In block 605, the re-routing capability is provided to the WRAT via bridge or tunnel to route any request for connection from any identified rouge mobile device from the network access point to the deceptive network's pseudo-access point for access into the deceptive network.

In block 606, a lure for the rouge mobile attacker is established by providing weak spots or back door entry in the pseudo-fire wall 510 that protect the deceptive network 500. The weak spots should be recognizable by good hackers but un-obvious in nature to entice penetration by the attacker without arousing suspicion.

In block 607, once an attacker has been enticed into the deceptive network the attacker is allowed to attack the nodes of the deceptive network. From the captured header, and packets that are sent to the DFR 556, the DFR 556 does deep packet inspection and establishes a complete signature of the attacker. From the enabled attack information on the nodes of the deceptive network the DFR 556 extracts the modality of attack and generates responses to any possible successful attack on the network and also generates a recovery strategy.

In block 608, the generated defensive information is used by the DFR to establish a wireless threat intelligence capability to prevent future attacks by the attackers and also develop the recovery capability using collected and extracted information on attackers. Distribution and sharing of the collected and analyzed data on the attack and attackers over the net and cloud by users of deceptive network can be used by entities to identify and prevent attacks and foil the effort of the attackers to hack into enterprises.

Figure 7:
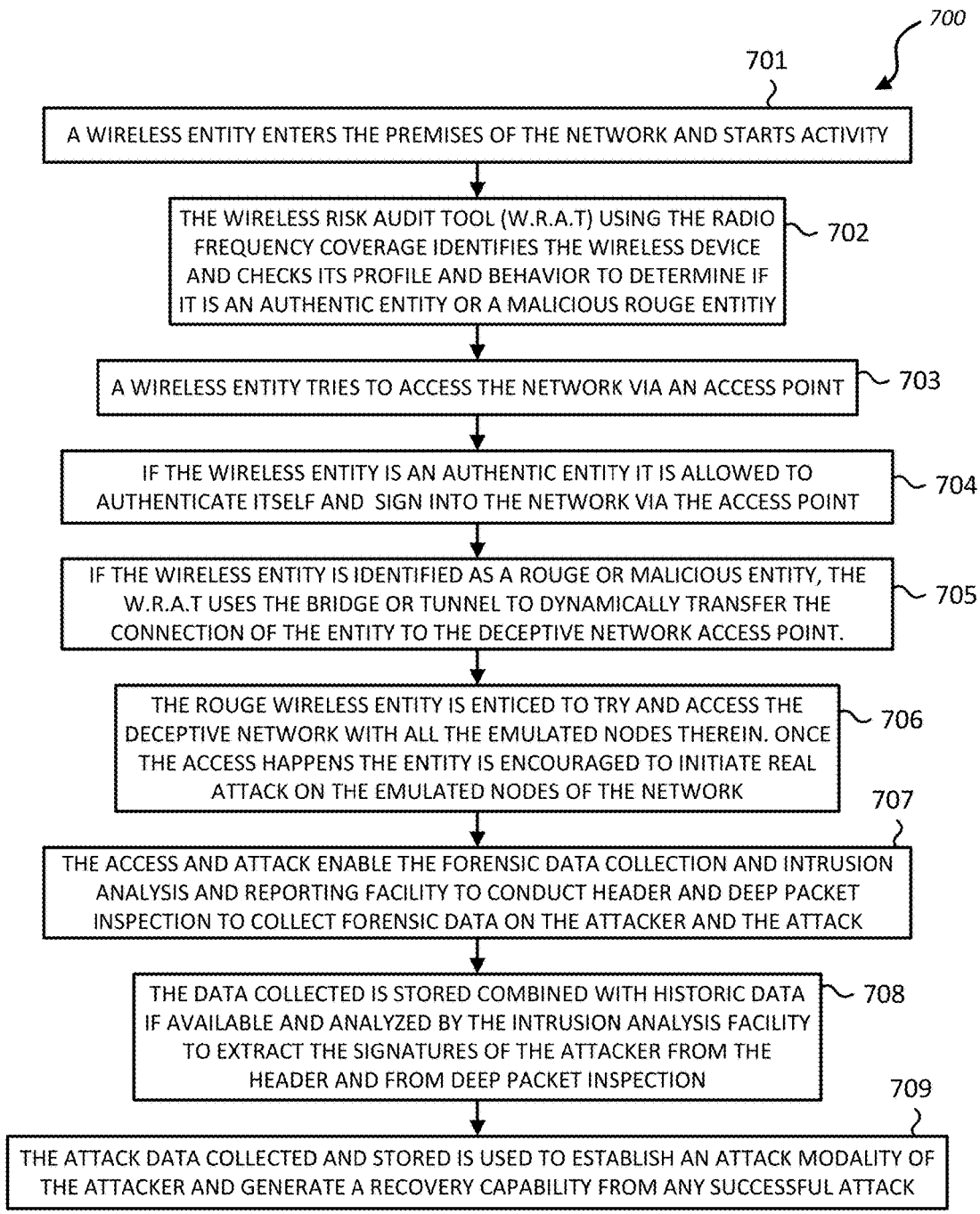
FIG. 7 is a flow chart illustrating use of a deceptive network to provide protection and recovery capability to a network according to an example embodiment.

FIG. 7 is a flow chart 700 of the implementation of the NPS to provide the necessary protection for a network 550 using the NPPS that includes a deceptive network 500, a WRAT system (such as WRAT 300) and a DFR system (such as DFR 400).

In this regard, the following embodiments may be described as a process 700, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc. Process 700 may be performed by processing logic that includes hardware (e.g., circuitry, dedicated logic, etc.), software (e.g., embodied on a non-transitory computer readable medium), or a combination thereof.

In block 701, a wireless entity enters the premises of the network and starts wireless related activity.

In block 702, the wireless risk audit tool (WRAT) using the monitoring access points distributed over the protected network area with the radio frequency coverage monitors the wireless activity. Using the pre-established behavior acceptability profiles, the WRAT is able to determine the status of each of the mobile entities, if each of the mobile entities is an authentic entity or a malicious rouge entity.

In block 703, the wireless entities now connect to the access point to access the network via the access point.

In block 704, if a wireless entity is identified as an authentic entity by the WRAT based on the behavior profile, it is allowed to authenticate itself and sign into the network via the access point.

In block 705, if the wireless entity is identified as a rouge or malicious entity by the WRAT, based on the behavior profile, the WRAT uses a bridge or tunnel to dynamically transfer the connection of the entity from the access point of the wireless network to the pseudo-access point of the deceptive network.

In block 706, the rouge wireless entity is now enticed to try and access the deceptive network, by presenting the attacking entity with weak points within the emulated fire wall or back door entrance to the deceptive network with all the emulated nodes therein. Once the entity has penetrated the firewall to access the deceptive network, the entity is encouraged to initiate an attack on the emulated nodes of the network.

In block 707, access into the deceptive network and attack enable the DFR to conduct a full header and deep packet inspection to collect forensic data on the attacker. Further the DFR is able to extract data on the attack modality of the attacker from the attack on the deceptive network nodes.

In block 708, the data collected is combined with historic data if available and stored at the DFR. The available data is further analyzed by the DFR to extract complete signatures and identification of the attacker from the header and from deep packet inspection.

In block 709, the data collected on the attacker and attack and stored by the DFR is compiled by the DFR and is used to establish an attack modality of the attacker and generate a recovery capability from any possible successful attack. The information is also made available to other entities to use in generating protection schemes against similar attacks.

By virtue of the arrangements disclosed herein, and particularly the processes of FIGS. 6 and 7, it is possible to continuously monitor a wide wireless spectrum using dedicated access points within the network premises for wireless activity using a WRAT system, such as WRAT 300. In addition, it becomes possible to analyze and identify rouge mobile units by their behavioral patterns even prior to active attacks.

Also, by virtue of the arrangements discussed herein, it is advantageously possible to divert rouge connection requests to the deceptive network's pseudo-access point. Furthermore, it is possible to specifically lure attackers into penetrating the security screens of the deceptive network by providing hidden but identifiable weak spots in the security established. Moreover, by virtue of the arrangements disclosed herein, and particularly by inviting attacks by the attacker on the nodes of the deceptive network, it is possible to understand the modality of attack of the attacker to extract remedial measures in case of a future successful attack on the main network. It is also possible to conduct header and deep packet inspection on the attacker to extract the identity of the attacker and generate a complete signature of the attacker to enable the NPS to prevent future access and attacks by the same attacker on the network.

The processes described herein (e.g., processes 600 and 700) are not limited to the specific examples described. For example, processes 600 and 700 are not limited to the specific processing orders of FIGS. 6 and 7, respectively. Rather, any of the processing blocks of these figures may be re-ordered, combined or removed, performed in parallel or in serial, as necessary, to achieve the results set forth above. The processing blocks (for example, in the process 600 and the process 700) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate. Further, processes 600 and 700 can be implemented in any combination hardware devices and software components.

The processes described herein (e.g., process 600 and process 700) are not limited to use with the hardware and software of FIGS. 1 to 5; they may find applicability in any computing or processing environment and with any type of machine or set of machines that is capable of running a computer program. The processes described herein may be implemented in hardware, software (including computer code stored on a computer-readable medium, such as a hard drive or system memory), or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

Embodiments of the NPS and NPPS may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable storage medium that is readable by a general or special purpose programmable computer for configuring and operating the computer when the non-transitory machine-readable medium is read by the computer to perform the processes described herein.

For example, the systems and processes described herein may also be implemented as a non-transitory machine-readable storage medium having stored thereon instructions which program a processor to perform some or all of the operations described above. The non-transitory machine-readable storage medium may be configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se. In other embodiments, some of these operations might be performed by specific hardware components that contain hardwired logic. Those operations might alternatively be performed by any combination of programmable computer components and fixed hardware circuit components.

The terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing or encoding a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, and optical and magnetic media, or any other non-transitory machine-readable medium.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A computer-implemented method of protecting an active wireless network, the method performed using a network protection system having a wireless risk audit tool and a deceptive network, the method comprising:
   identifying nodes and connections of the active wireless network;
   emulating the deceptive network including the identified nodes and connections of the active wireless network and a pseudo-access point, wherein the emulated deceptive network further includes a firewall having a discoverable point of weakness;
   establishing, using the wireless audit tool, radio frequency coverage of a protected area including the active wireless network to detect radio frequency activity in the protected area;
   establishing authorized security protocols and access behavior patterns for access to the active wireless network;
   continuously monitoring, using a plurality of hidden and open access points and the wireless risk audit tool, radio frequency activity over a range of radio frequency spectrum within the protected area;
   identifying from the monitored radio frequency activity, using the wireless risk audit tool, suspicious radio activity based on the established authorized security protocols or the authorized access behavior patterns for access to the active wireless network;
   re-routing, by the wireless risk audit tool, the identified suspicious radio activity to the pseudo-access point of the deceptive network for access into the deceptive network;
   exposing the discoverable point of weakness of the firewall included in the deceptive network to lure an unauthorized attacker associated with the suspicious radio activity to gain access to the deceptive network;
   capturing activity data of the unauthorized attacker while the attacker accessing the deceptive network;
   extracting threat information from the captured activity data on a modality of attack of the unauthorized attacker and an identity of the unauthorized attacker by performing header inspection and deep packet inspection on the captured activity data;
   further extracting a signature of the unauthorized attacker from the captured activity data; and
   developing a response for a recovery from the attack and for prevention of future attacks using the extracted threat information and signature of the unauthorized attacker.

2. The method of claim 1, wherein extraction of the signature of the unauthorized attacker is based on the captured activity data and historic data.

3. The method of claim 1, wherein the discoverable point of weakness of the firewall is constructed such that the unauthorized attacker is lured to attack the deceptive network, and wherein the deceptive network allows the unauthorized attacker to attack the nodes included in the deceptive network.

4. The method of claim 1, wherein the deceptive network emulates the active wireless network.

5. A data processing system for preventing attacks on an active wireless network, the system comprising:
   a processor; and
   a memory coupled to the processor to store instructions, which when executed by the processor, cause the processor to perform operations, the operations including:
   identifying nodes and connections of the active wireless network;
   emulating a deceptive network including the nodes and connections of the active wireless network and a pseudo-access point, wherein the emulated deceptive network further includes a firewall having a discoverable point of weakness;
   establishing radio frequency coverage of a protected area including the active wireless network to detect radio frequency activity in the protected area;
   establishing authorized security protocols and access behavior patterns for access to the active wireless network;
   continuously monitoring radio frequency activity over a range of radio frequency spectrum within the protected area;
   identifying from the monitored radio frequency activity suspicious radio activity based on the established authorized security protocols or the authorized access behavior patterns for access to the active wireless network;
   re-routing the identified suspicious radio activity to the pseudo-access point of the deceptive network for access into the deceptive network;
   exposing the discoverable point of weakness of the firewall included in the deceptive network to lure an unauthorized attacker associated with the suspicious radio activity to gain access to the deceptive network;

capturing activity data of the unauthorized attacker while the attacker accessing the deceptive network;

extracting threat information from the captured activity data on a modality of attack of the unauthorized attacker and an identity of the unauthorized attacker by performing header inspection and deep packet inspection on the captured activity data;

further extracting a signature of the unauthorized attacker from the captured activity data; and developing a response for a recovery from the attack and for prevention of future attacks using the extracted threat information and signature of the unauthorized attacker.

6. The system of claim 5, wherein extraction of the signature of the unauthorized attacker is based on the captured activity data and historic data.

7. The system of claim 5, wherein the discoverable point of weakness of the firewall is constructed such that the unauthorized attacker is lured to attack the deceptive network, and wherein the deceptive network allows the unauthorized attacker to attack the nodes included in the deceptive network.

8. The system of claim 5, wherein the deceptive network emulates the active wireless network.

9. A non-transitory computer-readable storage medium storing computer-executable instructions, which when executed by a processor, cause the processor to perform operations for protecting an active wireless network, the operations comprising:

identifying nodes and connections of the active wireless network;

emulating a deceptive network including the identified nodes and connections of the active wireless network and a pseudo-access point, wherein the emulated deceptive network further includes a firewall having a discoverable point of weakness;

establishing radio frequency coverage of a protected area including the active wireless network to detect radio frequency activity in the protected area;

establishing authorized security protocols and access behavior patterns for access to the active wireless network;

continuously monitoring radio frequency activity over a range of radio frequency spectrum within the protected area;

identifying from the monitored radio frequency activity suspicious radio activity based on the established authorized security protocols or the authorized access behavior patterns for access to the active wireless network;

re-routing the identified suspicious radio activity to the pseudo-access point of the deceptive network for access into the deceptive network;

exposing the discoverable point of weakness of the firewall included in the deceptive network to lure an unauthorized attacker associated with the suspicious radio activity to gain access to the deceptive network;

capturing activity data of the unauthorized attacker while the attacker accessing the deceptive network;

extracting threat information from the captured activity data on a modality of attack of the unauthorized attacker and an identity of the unauthorized attacker by performing header inspection and deep packet inspection on the captured activity data;

further extracting a signature of the unauthorized attacker from the captured activity data; and developing a response for a recovery from the attack and for prevention of future attacks using the extracted threat information and signature of the unauthorized attacker.

10. The non-transitory computer-readable storage medium of claim 9, wherein extraction of the signature of the unauthorized attacker is based on the captured activity data and historic data.

11. The non-transitory computer-readable storage medium of claim 9, wherein the discoverable point of weakness of the firewall is constructed such that the unauthorized attacker is lured to attack the deceptive network, and wherein the deceptive network allows the unauthorized attacker to attack the nodes included in the deceptive network.

12. The non-transitory computer-readable storage medium of claim 9, wherein the deceptive network emulates the active wireless network.

13. A computer-implemented method of protecting an active wireless communication network by establishing a deceptive network that emulates the active wireless communication network, the method being performed by a data processing system, the method comprising:

generating the deceptive network, wherein the generated deceptive network emulates nodes and connections of the active wireless communication network including a firewall having a discoverable point of weakness;

continuously monitoring, using a plurality of access points, radio frequency activity over a range of radio frequency spectrum within a protected area having the active wireless communication network;

re-routing, using a wireless risk audit tool on the data processing system, suspicious radio activity identified from the monitored radio frequency activity to the deceptive network via a pseudo-wireless access point to allow access into the deceptive network;

collecting activity data of an unauthorized user associated with the suspicious radio frequency activity, using a data capture and forensic analysis and reporting tool on the data processing system, on an activity of attack by the unauthorized user within the deceptive network and an identity of the unauthorized user;

extracting, using the data capture and forensic analysis and reporting tool, a signature of the unauthorized user and a modality of attack by the unauthorized user from the collected activity data;

developing a response for a recovery from the attack and for prevention of future attacks using the collected activity data and extracted signature; and providing the developed response to a threat intelligence established by the data capture and forensic analysis and reporting tool to ensure the recovery.

* * * * *